(12) United States Patent
Scherer et al.

(10) Patent No.: US 7,433,354 B2
(45) Date of Patent: Oct. 7, 2008

(54) BUS SYSTEM FOR AN AIRCRAFT

(75) Inventors: Thomas Scherer, Hamburg (DE); Volker Von Doehlen, Hamburg (DE)

(73) Assignee: Airbus Deutschland GmbH (DE)

( * ) Notice: Subject to any disclaimer, the term of this patent is extended or adjusted under 35 U.S.C. 154(b) by 657 days.

(21) Appl. No.: 11/014,284

(22) Filed: Dec. 16, 2004

(65) Prior Publication Data

US 2005/0190760 A1 Sep. 1, 2005

(30) Foreign Application Priority Data

Dec. 23, 2003 (DE) ................. 103 60 856

(51) Int. Cl.
*H04L 12/28* (2006.01)
*H04L 12/56* (2006.01)

(52) U.S. Cl. ................. 370/389; 370/489; 710/100

(58) Field of Classification Search ................. 370/423, 370/431, 470, 472, 489, 464, 465; 710/100, 710/107, 110, 111; 709/207, 238
See application file for complete search history.

(56) References Cited

U.S. PATENT DOCUMENTS

| 5,524,213 | A | 6/1996 | Dais et al. | |
| 7,103,688 | B2 * | 9/2006 | Strong | 710/106 |
| 2004/0122978 | A1 * | 6/2004 | Bird | 709/246 |
| 2004/0205265 | A1 * | 10/2004 | Ling et al. | 710/28 |
| 2004/0236886 | A1 * | 11/2004 | Viard et al. | 710/100 |
| 2006/0095146 | A1 * | 5/2006 | Hesse et al. | 700/19 |
| 2006/0212863 | A1 * | 9/2006 | Warnes | 717/159 |

FOREIGN PATENT DOCUMENTS

DE 41 29205 A1 10/1992

OTHER PUBLICATIONS

Robert Bosch GMBH, "Can Specification, Version 2.0," 1991, Robert Bosch GmbH, XP-002346344.
ATA Specification 2200 (iSpec 2200), Information Standards For Aviation Maintenance, Revision 2003.1, © 2003.
Mark 33 Digital Information Transfer System (DITS) Part I, Functional Description, Electrical Interface, Label Assignments and Word Formats, ARINC Specification 429Part1-16, Published Sep. 27, 2001.
DIN ISO 11898, Road Vehicles—Interchange of digital information—Controller area network (CAN) for high-speed communication. Aug. 1995.

* cited by examiner

*Primary Examiner*—Ajit G Patel
(74) *Attorney, Agent, or Firm*—Lerner, David, Littenberg, Krumholz & Mentlik, LLP

(57) ABSTRACT

The present invention relates to a bus system for transmitting a data packet between multiple devices in an aircraft, which is based on the CAN data bus system, but has an expanded identification field, in which a fixed region is designed for identification of the manifold aircraft systems, through which each aircraft system may be addressed uniquely. According to an exemplary embodiment, the data packet may be sent with different priorities, through which "important" data packets have priority on the transmission medium.

8 Claims, 2 Drawing Sheets

| CAN Identifier Bit | | | | | | ATA Chapter | Aircraftsystem-Description |
|---|---|---|---|---|---|---|---|
| 5 | 4 | 3 | 2 | 1 | 0 | | |
| 0 | 0 | 0 | 0 | 0 | 0 | - | Reserved |
| 0 | 0 | 0 | 0 | 0 | 1 | 21 | Air conditioning system |
| 0 | 0 | 0 | 0 | 1 | 0 | 22 | Auto flight |
| 0 | 0 | 0 | 0 | 1 | 1 | 23 | Communications |
| 0 | 0 | 0 | 1 | 0 | 0 | 24 | Electrical power |
| 0 | 0 | 0 | 1 | 0 | 1 | 25 | Equipment / furnishings |
| 0 | 0 | 0 | 1 | 1 | 0 | 26 | Fire protection |
| 0 | 0 | 0 | 1 | 1 | 1 | 27 | Flight controls |
| 0 | 0 | 1 | 0 | 0 | 0 | 28 | Fuel |
| 0 | 0 | 1 | 0 | 0 | 1 | 29 | Hydraulic power |
| 0 | 0 | 1 | 0 | 1 | 0 | 30 | Ice and rain protection |
| 0 | 0 | 1 | 0 | 1 | 1 | 31 | Indication / recording system |
| 0 | 0 | 1 | 1 | 0 | 0 | 32 | Landing gear |
| 0 | 0 | 1 | 1 | 0 | 1 | 33 | Lights |
| 0 | 0 | 1 | 1 | 1 | 0 | 34 | Navigation |
| 0 | 0 | 1 | 1 | 1 | 1 | 35 | Oxygen |
| 0 | 1 | 0 | 0 | 0 | 0 | 36 | Pneumatic |
| 0 | 1 | 0 | 0 | 0 | 1 | - | Spare |
| 0 | 1 | 0 | 0 | 1 | 0 | 38 | Water / waste |
| : | : | : | : | : | : | - | Spare |
| 0 | 1 | 0 | 1 | 1 | 0 | 42 | IMA |
| 0 | 1 | 0 | 1 | 1 | 1 | - | Spare |
| 0 | 1 | 1 | 0 | 0 | 0 | 44 | Cabin systems |
| 0 | 1 | 1 | 0 | 0 | 1 | 45 | Onboard maintenance systems |
| 0 | 1 | 1 | 0 | 1 | 0 | 46 | Informationsystems (CIDS, IFC etc.) |
| : | : | : | : | : | : | - | Spare |
| 0 | 1 | 1 | 1 | 0 | 1 | 49 | AFU |
| 0 | 1 | 1 | 1 | 1 | 0 | 50 | Cargo loading and accessory compartments |
| 0 | 1 | 1 | 1 | 1 | 1 | 51 | Spare |
| 1 | 0 | 0 | 0 | 0 | 0 | 52 | Doors |
| : | : | : | : | : | : | - | Spare |
| 1 | 1 | 0 | 0 | 1 | 1 | 71 | Power plant |
| 1 | 1 | 0 | 1 | 0 | 0 | 72 | Engine |
| 1 | 1 | 0 | 1 | 0 | 1 | 73 | Engine fuel and control |
| 1 | 1 | 0 | 1 | 1 | 0 | 74 | Ignition |
| 1 | 1 | 0 | 1 | 1 | 1 | - | Spare |
| 1 | 1 | 1 | 0 | 0 | 0 | 76 | Engine controls |
| 1 | 1 | 1 | 0 | 0 | 1 | 77 | Engine indicating |
| 1 | 1 | 1 | 0 | 1 | 0 | 78 | Exhaust |
| 1 | 1 | 1 | 0 | 1 | 1 | 79 | Oil |
| 1 | 1 | 1 | 1 | 0 | 0 | 80 | Starting |
| 1 | 1 | 1 | 1 | 0 | 1 | - | Spare |
| 1 | 1 | 1 | 1 | 1 | 0 | - | Spare |
| 1 | 1 | 1 | 1 | 1 | 1 | - | Reserved |

FIG 3

BUS SYSTEM FOR AN AIRCRAFT

BACKGROUND OF THE INVENTION

The present invention relates to a bus system for transmitting a data packet between multiple devices in an aircraft, an aircraft having a bus system for transmitting the data packet between multiple devices, and a method for transmitting a data packet on a bus system between multiple devices in an aircraft.

The ARINC 429 standard has established itself for data transmission between various systems/devices in aircraft. In this case, there is always only one transmitter per data bus (monomaster bus), which transmits data to one or more receivers unidirectionally. Therefore, a separate ARINC 429 data bus is always necessary for each transmitter.

The CAN (controller area network) standard, which originated in the automobile industry, offers the possibility of bidirectional communication and parallel access between multiple systems/devices of different criticality to a shared transmission medium. In the CAN data bus system, a data packet ("CAN data frame") is identified by the "CAN identifier". For this purpose, the CAN standard according to DIN ISO 11898 alternately defines a "standard identifier" having a length of 11 bits or alternatively an "extended identifier" having a length and 29 bits.

SUMMARY OF THE INVENTION

There may be a need for a bus system for transmitting a data packet between multiple devices in an aircraft which ensures communication for safety-critical functions of the aircraft.

A data packet in a CAN data bus system according to an exemplary embodiment of the present invention has an expanded identification field having a length of 29 bits in order to identify a receiver of the data packet. A fixed region of the expanded identification field is designed for identification of the manifold aircraft systems, through which each aircraft system may be addressed uniquely.

Advantageously, it may thus be made possible for multiple applications and (sub-)systems of differing criticality on the same bus system to be identified. In this way, because a fixed region of the expanded identification field is designed for identification of the aircraft systems, unique assignment of the data packet is made possible, through which ensuring communication for safety-critical functions may also be achieved. In addition, the bus system according to the present invention is expandable, by adding further devices, for example, without a software modification in already existing devices being necessary, so that flexibility in the customer-specific configuration is made possible. The bus system according to the present invention is also expandable for future new applications.

According to another exemplary embodiment of the present invention, bits of the highest significance, i.e., the higher-value bits of the expanded identification field, are designed to determine a priority of the data packet, so that an aircraft system having higher criticality may be addressed using a high data packet priority.

According to a further exemplary embodiment of the present invention, bits of the lowest significance, i.e., the lower-value bits of the expanded identification field, are designed to indicate a system ID, which preferably has 6 bits, this system ID being assigned to corresponding ATA chapters.

BRIEF DESCRIPTION OF THE DRAWINGS

In the following, exemplary embodiments of the present invention are described with reference to the attached drawing.

FIG. 3 shows a table which lists exemplary assignments between the system ID and ATA chapters according to the present invention.

DETAILED DESCRIPTION

Figure 1:
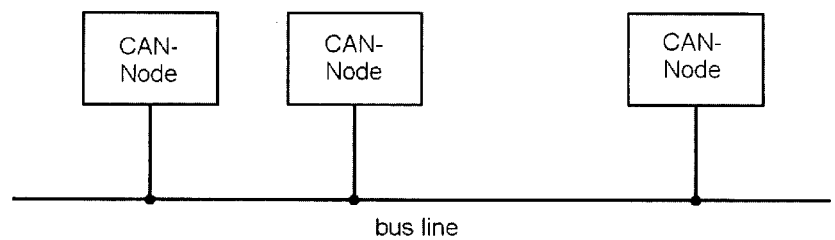
FIG. 1 shows a simplified illustration of an exemplary embodiment of the bus system according to the present invention.

FIG. 1 shows a simplified illustration of a bus system according to an exemplary embodiment of the present invention. The bus system according to the present invention is particularly designed and adapted for application in aircraft. To a large extent, the bus system according to the present invention corresponds to the CAN standard according to DIN ISO 11898, the differences according to the present invention existing as described in the following, however.

As may be inferred from FIG. 1, the bus system according to this exemplary embodiment is a communication system which has multiple components (nodes) with equality of access connected to one another via a two-wire bus, for example. The CAN nodes are each connected to the two wires of the bus system.

The bus system is designed for bidirectional communication and for parallel access of multiple nodes. The nodes may have different criticality. The nodes all access the same transmission system, i.e., the same bus line.

In an aircraft in particular, the differentiation of systems or nodes of different criticality is essential. A breakdown of cabin lighting, for example, is to be handled with a different priority than a simultaneously occurring breakdown of the engine control. Correspondingly, according to the present invention, an identification field of the data packet which has a higher priority is provided with a higher message priority (e.g., the data packet which relates to the engine control) than, for example, a lower-priority data packet (which relates to cabin lighting, for example).

During data transmission, the individual nodes are not addressed, but rather the content of the message is identified through a unique identifier. In addition to the content identification, as already noted above, the priority of the data packet is also determined. Using the acceptance check which then follows, all stations, i.e., all devices or nodes connected to the bus line, after correct receipt of the message, determine on the basis of the identifier whether the data received is relevant for them or not. High flexibility is achieved through the content-based addressing. Stations may be added to the existing data system very easily.

In addition, the possibility of multicasting results. A message may be received and analyzed simultaneously by multiple users. Measured variables which are needed by multiple control units as information, for example, may be distributed via the bus system in such a way that each control unit does not require its own sensor.

Each user, i.e., each aircraft system or each device which is connected to the bus line, may send data without a special request to any master. As in an ethernet, for example, collisions may occur here, which may be solved using hardware, however, and may be corrected through repetition. A collision is recognized in that a transmitter reads back and compares the transmitted identifier itself. In the event of inequality, a user having higher priority was there, which drew the line in the dominant level at some point.

The identifier having the lowest binary number thus has the highest priority.

The procedure for collision checking via the identifier may also be referred to as "bit-by-bit arbitration". In accordance with a "wired and mechanisms", in which the dominant state on the bus line (logical zero) exceeds the recessive state (logical 1), all of the nodes which transmit recessive lose the rivalry for the bus line, but also observe the bus as dominant. All "losers" automatically become receivers of the message with the highest priority and only attempt to transmit again when the bus becomes free.

Therefore, a bus system is provided which executes a need-dependent bus allocation.

Even simultaneous bus accesses of multiple modes must always lead to a unique bus distribution. Through the previously described method of bit-by-bit arbitration via the identifier of the messages pending for transmission, each collision is uniquely resolved after a calculable time. According to the CAN standard format there are at most 13 bit characters, in the expanded format there are at most 33 bit characters.

As may be inferred from the nature of the CAN bus, messages on the bus system are exchanged and/or sent on the bus system via the bus line using data packets. For this purpose, a message is packaged in the frame form specific for the bus system. For example, as already noted above, the format defined in the DIN standard ISO 11898 may be appropriately adapted and used here. Such a data packet may also be referred to as a "FRAME". A FRAME comprises seven characteristics, namely the start condition, the message identifier, control bits, data bits (0-8 bytes), check bits, acknowledge bits, and stop condition. The start condition and the stop condition may be used for synchronization.

FRAMES also differ according to the length of the identifier. There is the standard FRAME, which has an 11-bit identifier, and the extended FRAME, which has a 29-bit identifier. According to one exemplary embodiment of the present invention, the extended FRAME having a 29-bit identifier, which the following description is also based on, is preferably used. The 29-bit identifier of the data packet may also be referred to as an expanded identification field. One may also differentiate between data FRAMES and remote data FRAMES according to the type of the FRAME, this differentiation not being discussed in greater detail here.

Figure 2:
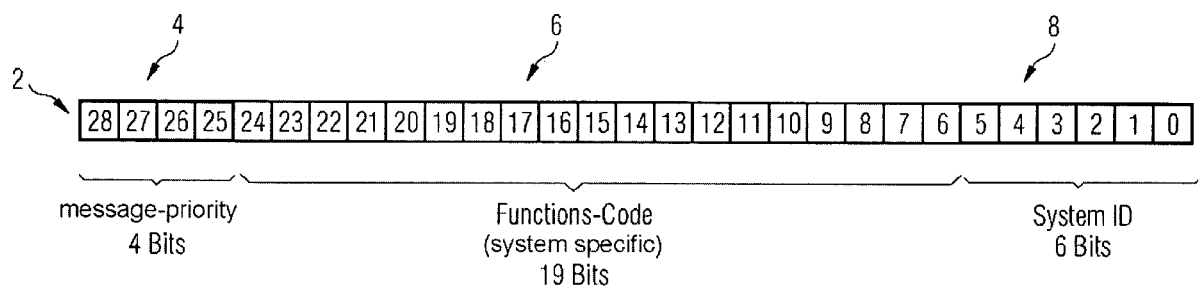
FIG. 2 shows a simplified illustration of an exemplary embodiment of an expanded identification field of a data packet in a bus system according to the present invention.

FIG. 2 shows an exemplary embodiment of an expanded identification field which is a part of the data packet in the bus system according to the present invention. As may be inferred from FIG. 2, the expanded identification field or the extended identifier has a length of 29 bits, the bits being numbered from the least significant bit upward to the most significant bit. The bit having the lowest significance LSB (least significant bit) is the bit 0 on the right side and the bit having the highest significance MSB (most significant bit) is the bit 28 on the left side. The expanded identification field, which is shown in FIG. 2, is identified with the reference number 2. The reference number 4 in FIG. 2 identifies the four highest-value bits of the expanded identification field 2 and the reference number 8 identifies the six lowest-value bits or bits provided with lowest significance of the identification field 2. The bits 6 through 24, which are positioned between the system ID having a length of 6 bits, comprising the bits 0 through 5, and the message priority, comprising the bits 25 to 28, relate to a function code 6, which may be designed system-specific and has a length of 19 bits. The function code may, for example, determine the function to be performed by the receiver which is addressed using the system ID.

According to an exemplary embodiment of the present invention, prioritization of highly-critical systems, i.e., systems having the highest criticality in an aircraft, allows, if multiple devices or flight systems access the bus line simultaneously, the system having the highest priority to be able to actually access the bus line and transmit the corresponding data packet. In this way, it is ensured that no delays occur at the critical systems and reliable transmission is ensured.

According to an exemplary embodiment of the present invention, the system ID which is contained in the expanded identification field in the bits 0 through 5 is assigned on the basis of ATA chapters of the flight system.

The complete name of this specification is ATA iSpec 2200: Information Standards for Aviation Maintenance. The ATA iSpec 2200 arose in the year 2000 through the combination of the following two specifications: ACA Spec 100: Manufacturers Technical Data and ACA iSpec 2100: Digital Data Standards for Aircraft Support. The ATA iSpec 2200 relates to technical documentation for aircraft maintenance. It comprises an industry-wide standard for numbering aircraft systems. The numbering system encountered in all of civil aviation in practically all fields for hierarchical organization of the aircraft in "ATA chapters" is essentially from the ATA Spec 100. This numbering system was adapted to new technical developments and is now also included in the ATA iSpec 2200.

Since an aircraft (possibly only under specific conditions) may be operated even if individual parts of the system components have broken down, the master-minimum equipment list (MMEL) in the ATA iSpec 2200 is a list containing the available components which are necessary as a minimum for safe operation of the aircraft. The MMEL is part of the approval documents of the aircraft.

The "ATA chapters" as the hierarchical organization of the aircraft (ATA breakdown), originally published in ATA iSpec 100, have permeated all of civil aircraft construction. These chapters are actually the chapters of the handbooks, among other things for the airframe and power plant systems. The aircraft components, i.e., the aircraft systems, are identified by a code which comprises three elements, each having two digits. The code 29-31-03, for example, indicates system 29, subsystem 31, and unit 03.

FIG. 3 shows an exemplary embodiment of a table of how the system IDs are assigned in regard to the ATA chapters. In other words, according to the present invention, the system ID uniquely refers to a corresponding ATA chapter. Through the use of the ATA chapters, the aeronautical engineering reliability of the communication protocol for safety-critical applications in an aircraft is simplified in particular.

As may be inferred from FIG. 3, the system IDs are coded binary and refer uniquely to corresponding ATA chapters. Thus, for example, system ID 110011 refers to ATA chapter 71, which relates to the "power plant".

In other words, according to the present invention, a bus system is provided in which data packets have an identification field whose six lowest-value bits are directly connected to ATA chapters which uniquely identify aircraft systems.

It is to be noted that the coding selected between the ATA chapters and the system IDs according to other exemplary embodiments of the present invention may also be designed differently and the table of FIG. 3 is merely to be understood as an example.

This advantageously allows the communication of applications and (sub-)systems of different criticality on the same data bus medium, i.e., on the same bus line, which, as noted above, may be a simple two-wire bus line. Through the use of a shared data bus medium, aircraft-side performance weights may be reduced. This also allows installation costs to be reduced. For the devices, simplification is made possible by. reducing the plug size (pin number) and a reduced number of data bus semiconductor components inside the devices is made possible.

Advantageously, in the course of the aeronautical engineering system approval, by determining message priorities in the communication between systems/devices of different criticality via a shared data bus medium, the aeronautical engineering approval is simplified and/or possible at all for the first time for safety-critical functions.

Furthermore, the present invention allows the data bus system to be expanded and/or the easy addition of further devices (e.g., in the course of a customer-specific configuration of the aircraft or when adding further applications) without applying software modifications to already existing devices.

What is claimed is:

1. A system for transmitting a data packet between multiple aircraft systems in an aircraft, comprising:
   a bus system which is a CAN data bus system,
   wherein the data packet in the CAN data bus system has an expanded identification field having a length of 29 bits to identify a receiver of the data packet,
   wherein a fixed region of the expanded identification field is designed for identification of the manifold aircraft systems, through which each aircraft system is addressable uniquely,
   wherein bits of the highest significance of the expanded identification field are adapted for determining a priority of the data packet, so that when the data packet for an aircraft system has a higher criticality it is addressable using a higher data packet priority.

2. The bus system according to claim 1,
   wherein a further region of the expanded identification field is adapted for definition of an aircraft-system-specific function code.

3. The bus system according to claim 1,
   wherein the bus system is a CAN standard according to DIN Iso 11898.

4. The bus system according to claim 1,
   wherein bits of the lowest significance identify the ATA chapter of the aircraft system.

5. A method of transmitting a data packet on a bus system between a plurality of aircraft systems in an aircraft, comprising the steps of:
   providing a bus system which is a CAN data bus system,
   wherein the data packet in the CAN data bus system has an expanded identification field having a length of 29 bits in order to identify a receiver of the data packet,
   wherein a fixed region of the expanded identification field is designed for identification of the manifold aircraft systems, through which each aircraft system is addressable uniquely,
   wherein bits of the highest significance of the expanded identification field are designed to fix a priority of the data packet, so that when the data packet for an aircraft system has a higher criticality it is addressable using a high data packet priority; and
   transmitting a data packet between said multiple aircraft systems.

6. The method according to claim 5,
   wherein a further region of the expanded identification field is designed to define an aircraft-system-specific function code.

7. The method according to claim 5,
   wherein the bus system is a CAN standard according to DIN ISO 11898.

8. The method according to claim 5,
   wherein bits of the lowest significance identify the ATA chapter of the aircraft system.

* * * * *

UNITED STATES PATENT AND TRADEMARK OFFICE
CERTIFICATE OF CORRECTION

| | | |
|---|---|---|
| PATENT NO. | : 7,433,354 B2 | Page 1 of 1 |
| APPLICATION NO. | : 11/014284 | |
| DATED | : October 7, 2008 | |
| INVENTOR(S) | : Thomas Scherer and Volker Von Doehlen | |

It is certified that error appears in the above-identified patent and that said Letters Patent is hereby corrected as shown below:

Col. 6, Line 7, "DIN Iso" should read --DIN ISO--.

Signed and Sealed this

Twenty-second Day of December, 2009

David J. Kappos
*Director of the United States Patent and Trademark Office*